(12) United States Patent
Garvis et al.

(10) Patent No.: US 9,004,921 B2
(45) Date of Patent: Apr. 14, 2015

(54) MOTION AND VIBRATION CUING SYSTEM

(75) Inventors: Andrew W. Garvis, Sorrento, FL (US);
Dennis P. Wilhelm, Orlando, FL (US);
Richard E. Johnson, Debary, FL (US);
Steven G. Lansrud, Groveland, FL (US)

(73) Assignee: Industrial Smoke & Mirrors, Inc., Orlando, FL (US)

( * ) Notice: Subject to any disclaimer, the term of this patent is extended or adjusted under 35 U.S.C. 154(b) by 46 days.

(21) Appl. No.: 13/116,046

(22) Filed: May 26, 2011

(65) Prior Publication Data
US 2012/0301853 A1     Nov. 29, 2012

(51) Int. Cl.
*G09B 9/08*     (2006.01)
*G09B 9/10*     (2006.01)
*G09B 9/12*     (2006.01)
*G09B 9/14*     (2006.01)

(52) U.S. Cl.
CPC ........................................ *G09B 9/14* (2013.01)

(58) Field of Classification Search
CPC .............. G09B 9/08; G09B 9/10; G09B 9/12
USPC ......................................... 434/30, 46, 55, 58
See application file for complete search history.

(56) References Cited

U.S. PATENT DOCUMENTS

| | | | | |
|---|---|---|---|---|
| 4,074,903 A * | 2/1978 | Diez de Aux | .................... | 482/71 |
| 4,753,596 A * | 6/1988 | Hart et al. | ......................... | 434/29 |
| 5,022,708 A | 6/1991 | Nordella et al. | | |
| 5,857,917 A * | 1/1999 | Francis et al. | .................. | 472/60 |
| 6,113,500 A | 9/2000 | Francis et al. | | |
| 7,094,157 B2 * | 8/2006 | Fromyer et al. | ................. | 472/59 |
| 7,382,830 B2 * | 6/2008 | Kondo et al. | ............ | 375/240.03 |
| 2003/0180693 A1 * | 9/2003 | Mulder et al. | ................... | 434/58 |
| 2005/0069839 A1 * | 3/2005 | Denne | ............................. | 434/29 |
| 2005/0277092 A1 * | 12/2005 | Hwang | .......................... | 434/55 |
| 2007/0059668 A1 * | 3/2007 | Mallaci et al. | .................. | 434/29 |
| 2008/0268404 A1 * | 10/2008 | Burt | ............................... | 434/55 |
| 2009/0244302 A1 * | 10/2009 | Tsai | ........................ | 348/208.99 |
| 2009/0246741 A1 * | 10/2009 | Soodeen et al. | ................ | 434/55 |
| 2011/0056074 A1 * | 3/2011 | Jonas et al. | ...................... | 29/829 |
| 2012/0248282 A1 * | 10/2012 | Malchev et al. | ............. | 248/550 |

FOREIGN PATENT DOCUMENTS

| | | |
|---|---|---|
| WO | 80/00507 A1 | 3/1980 |
| WO | 99/14724 A1 | 3/1999 |
| WO | 00/28505 A1 | 5/2000 |
| WO | 02/03352 A2 | 1/2002 |
| WO | 02/03352 A3 | 1/2002 |

OTHER PUBLICATIONS

Kim, Eddy et al. "Feeback control" Sep. 27, 2007. Retrieved from the internet on Nov. 14, 2012. Retrieved from <URL: https://controls.engin.umich.edu/wiki/index.php/Feedback_control>.*

* cited by examiner

*Primary Examiner* — Sam Yao
*Assistant Examiner* — Peter J Alley
(74) *Attorney, Agent, or Firm* — GrayRobinson, PA (57) ABSTRACT

A motion and vibration cuing system for use with a motion simulator provides vibratory, impulse, onset and sustained motion cuing, independently or simultaneously, by operation of a frame assembly capable of producing vibration and six degrees-of-freedom of motion in coordination with one or more motion seats, mounted to the frame assembly, which produce surge, sway, heave and roll motions.

26 Claims, 6 Drawing Sheets

MOTION AND VIBRATION CUING SYSTEM

FIELD OF THE INVENTION

This invention relates to motion simulators for aircraft, land vehicles and water vehicles, and, more particularly, to a motion and vibration cuing system for providing vibratory, impulse, onset and sustained motion cuing wherein the movement of motion seats is coupled to the movement of a frame assembly upon which the motion seats are mounted.

BACKGROUND OF THE INVENTION

One of the most common motion simulation systems in use today are flight simulators which re-create aircraft flight and different aspects of the flight environment. Flight simulators are employed for flight training, the design and development of aircraft, control handling evaluation and other purposes. Depending on the purpose of a particular device, flight simulators can range in complexity from PC-laptop models to full flight simulators employing replicas of an aircraft cockpit including controls, aircraft systems and wide-field outside-world (OTW) visual systems all mounted on six degree-of-freedom motion platforms which move in response to control commands from the cockpit and external aerodynamic forces. These motions include three linear movements, namely heave (up and down), surge (fore and aft) and sway (side-to-side), and, three rotational movements including pitch (rotation about the sway axis), yaw (rotation about the heave axis) and roll (rotation about the surge axis).

Current full flight simulators capable of meeting the so-called Level D standard promulgated by the Federal Aviation Administration in the U.S., employ a motion platform supported by six hydraulic or electric jacks. The motion platform, in turn, mounts a vibration platform upon which the replica cockpit of the aircraft is supported. The shaft of each jack, which is extended and retracted to obtain the desired motion, has a limited degree of travel and therefore the concept of acceleration onset cuing is relied upon to provide the user of the system with the desired sensation of motion for a particular aircraft maneuver or external aerodynamic forces applied to the aircraft. Onset cuing provides an initial acceleration of the cockpit which closely replicates that of an aircraft in flight, but then the jack movement is decreased to zero after which time the motion platform is reset to a neutral position at a rate below that of the sensory threshold of the user. This technique has proven effective in simulating the six degrees-of-freedom of motion noted above. Vibration, on the other hand, which may result from rough weather, blade rotation, out-of-balance rotor, rotor gearbox malfunctions and other causes, is simulated by the vibration platform positioned between the motion platform and cockpit.

Significant limitations of current full flight simulators of the type described above include their extreme physical size and substantial cost. Typically, full flight simulators require a motion envelope of about fifty feet in width, fifty feet in length and forty feet in height, with the size of the unit itself being about twenty feet wide, twenty-five feet long and twenty-five feet in height. A huge facility is required to house such simulators, and it is challenging and expensive to install systems of such size and complexity. Further, full flight simulators typically cost between one and three million dollars (US), not including the cost of the cockpit control and OTW systems.

SUMMARY OF THE INVENTION

This invention is directed to a motion and vibration cuing system particularly intended for aircraft, but also useful for land vehicles and water vehicles, in which vibratory, impulse, onset and/or sustained motion cuing are provided by a frame assembly capable of producing vibration and six degrees-of-freedom of motion in combination with one or more motion seats which produce surge, sway, heave and roll motions. In the particular application of this invention for use in aircraft simulation, the system herein supports a simulated cockpit that may include flight controls, other aircraft systems and an OTW system.

In one presently preferred embodiment, the system of this invention includes a host computer coupled to a control computer and to the instrumentation of the particular vehicle whose motion is to be simulated, such as the cockpit controls of an aircraft. In response to operation of aircraft instrumentation, for example, the host computer outputs a host control signal to the control computer. The control computer, in turn, is coupled to one or more motion seats mounted atop the frame assembly and to six frame actuators which support the frame assembly. An input command signal from the control computer is provided to both the motion seats and the frame actuators which combine to closely replicate the tactile and visual sensations that would be experienced by a pilot during a desired maneuver.

The frame actuators that support the frame assembly are effective to produce six degrees-of-freedom of motion, including surge, sway, heave, roll, pitch and yaw, as well as vibration. The motion seat(s) produce surge, sway, heave and roll motions. Collectively, the frame actuators and motion seat(s) provide the pilot with the sensation of movement through his or her tactile interface with the motion seat, as well as a visual indication of the corresponding movement of the cockpit created by the actuators acting on the frame assembly, in order to closely replicate the maneuver which the user is performing using the instrumentation of the aircraft and/or any external aerodynamic forces being applied to the aircraft.

DESCRIPTION OF THE DRAWINGS

The structure, operation and advantages of this invention will become further apparent upon consideration of the following drawings taken in conjunction with the accompanying drawings, wherein.

DETAILED DESCRIPTION OF THE INVENTION

Figure 1:
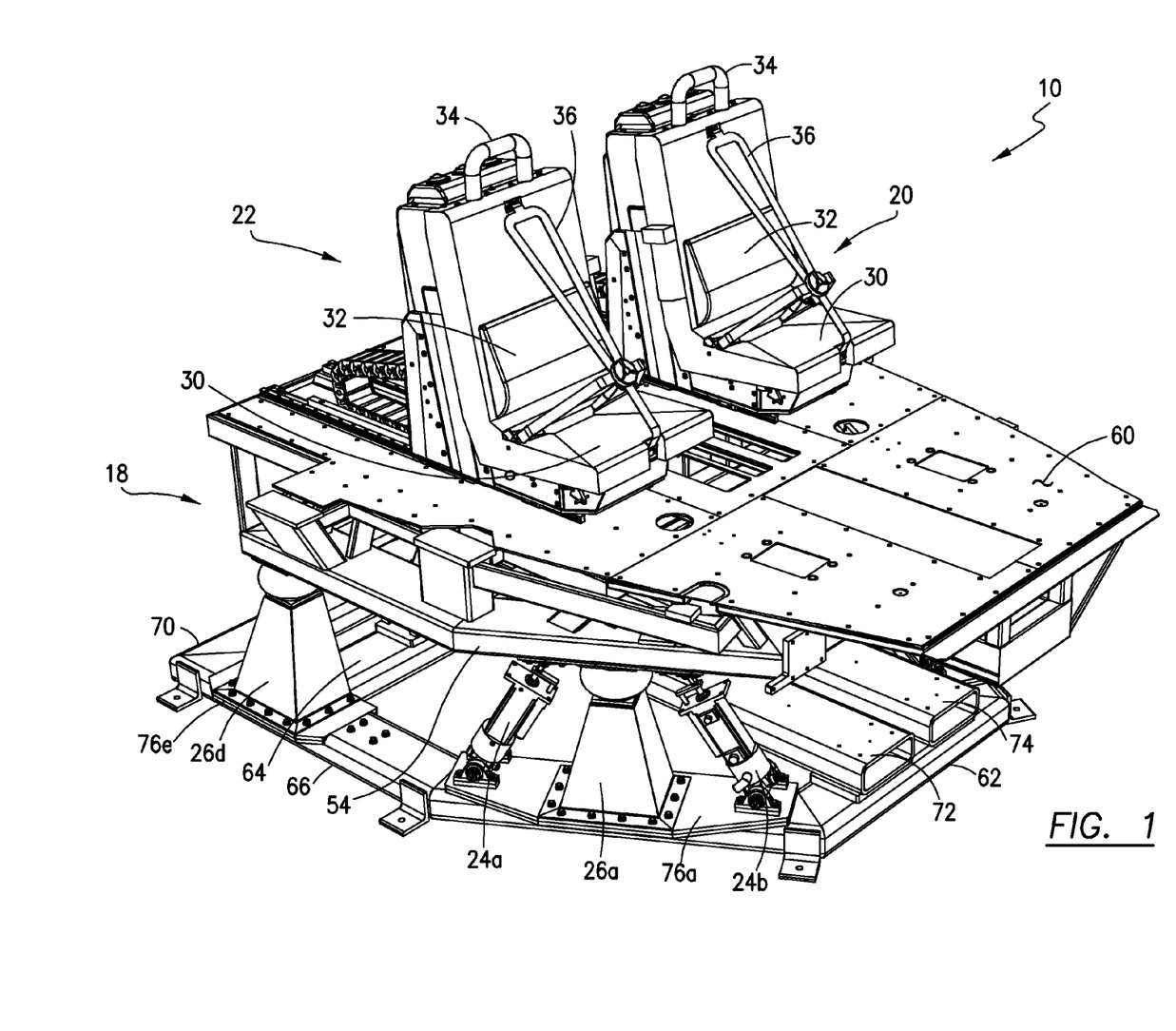
FIG. 1 is a perspective view of a preferred embodiment of the motion and vibration cuing system of this invention.
Figure 6:
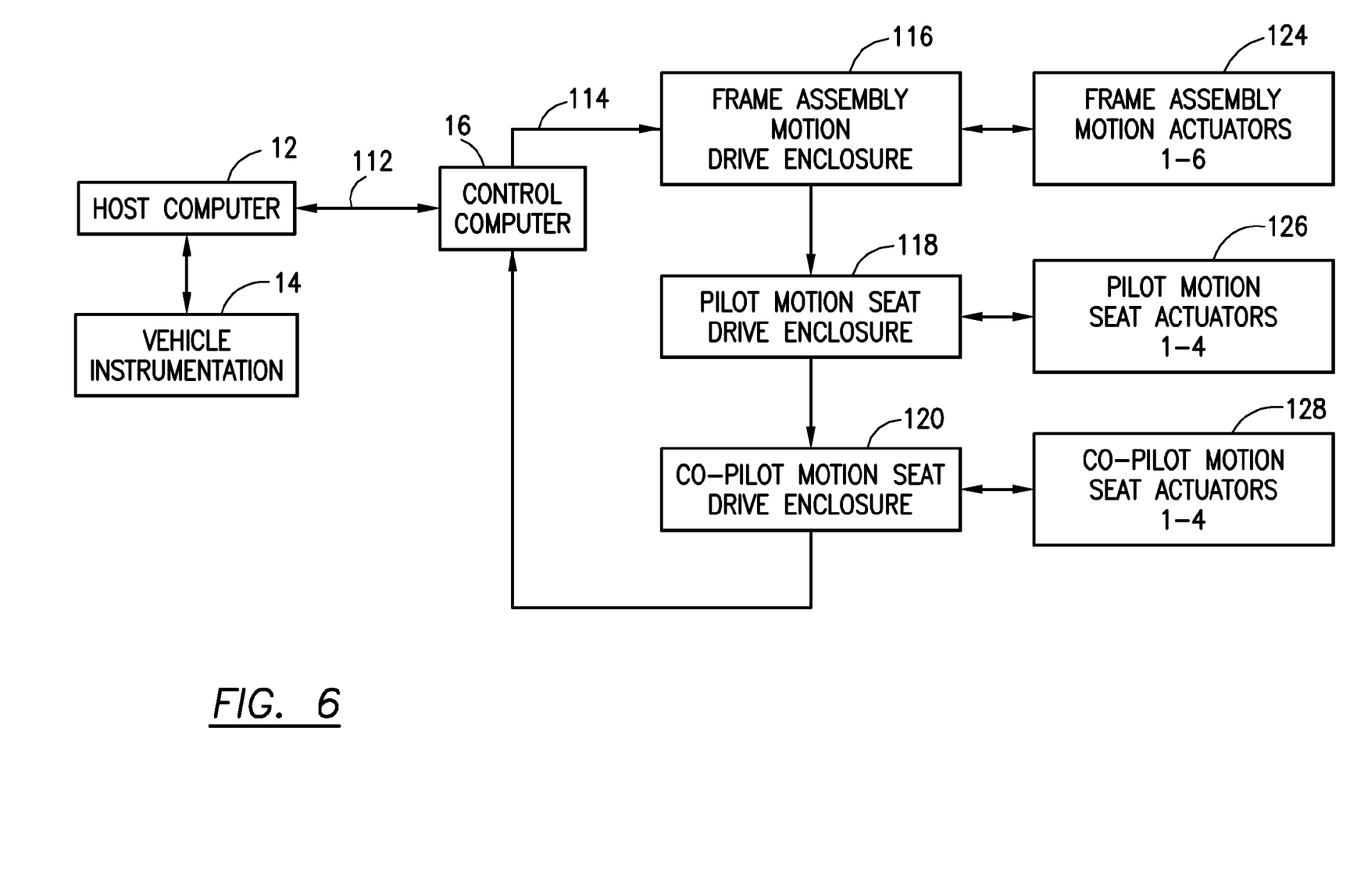
FIG. 6 is a schematic block diagram of the control system of this invention.

Referring initially to FIGS. 1 and 6, a motion and vibration cuing system 10 according to this invention is illustrated. The system 10 is adapted for use as part of motion simulation system (not shown) for a particular type of vehicle. For purposes of the present discussion, a full flight simulation system for aircraft is described herein but it should be understood that the system 10 may be employed with land vehicles and/or water vehicles. Further, the term "aircraft" is meant to broadly refer to fixed wing, rotary and hover craft.

Full flight simulation systems may include a cockpit with highly detailed replications of all of the flight controls and aircraft systems of a particular type of aircraft, as well as an OTW system which provides the user or pilot with a visual indication of what he or she would be seeing during flight. All of these components are commercially available and their details form no part of this invention and are therefore not discussed herein. As schematically depicted in FIG. 6 and discussed in detail below, the full flight simulator system includes a host computer 12 coupled to the cockpit controls or instrumentation 14 that a pilot would operate to perform different maneuvers with the aircraft, e.g. takeoff, landing, banking etc. The system 10 of this invention is coupled to the host computer 12 via a control computer 16 in order to provide a pilot with the sensations of movement and the visual indications associated with such maneuvers. Details of the components of system 10 are described below, followed by a discussion of the operation of system 10.

Referring now to FIGS. 1-5, the system 10 comprises a frame assembly 18 which mounts a pilot motion seat 20 and a co-pilot motion seat 22. The frame assembly 18, in turn, is supported by six frame actuators 24a-f and four isolators 26a-d which rest upon a base pad 28. Each of these elements of the system 10 is described separately below.

Figure 8:
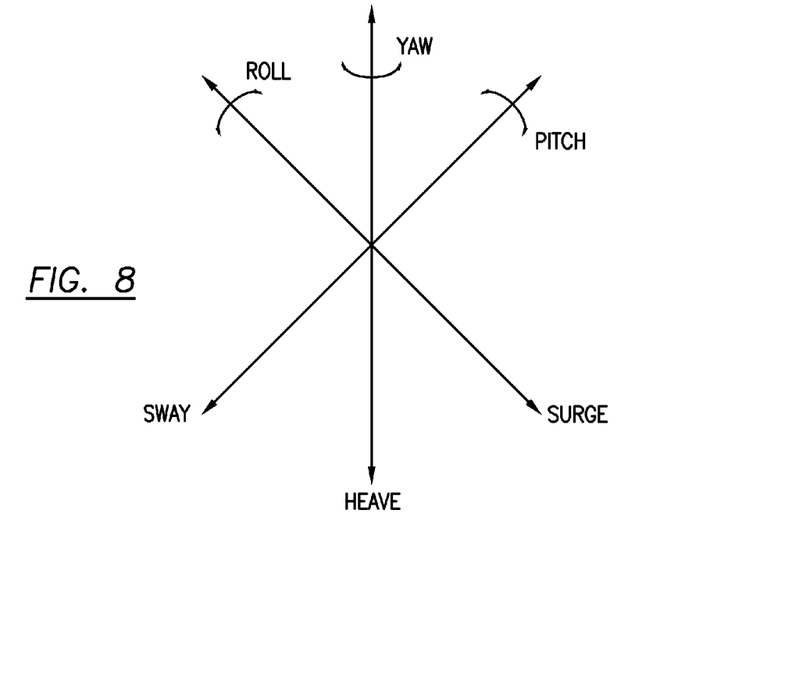
FIG. 8 is a view of the six degrees-of-freedom of motion that are provided by the actuators of this invention.

Each of the pilot and co-pilot motion seats 20, 22 includes a seat pan 30, a back pan 32, a head rest 34 and a seat belt 36. Seat actuators (not shown) are capable of moving the motion seats 20, 22 to simulate surge, sway, heave and roll motions of an aircraft during flight. FIG. 8 provides a schematic illustration of the six degrees-of-freedom of motion which the motion seats 20, 22, combined with the frame assembly 18, are capable of simulating. Details of the actuators and other structure for moving the motion seats 20, 22 form no part of this invention and are not discussed herein.

Figure 2:
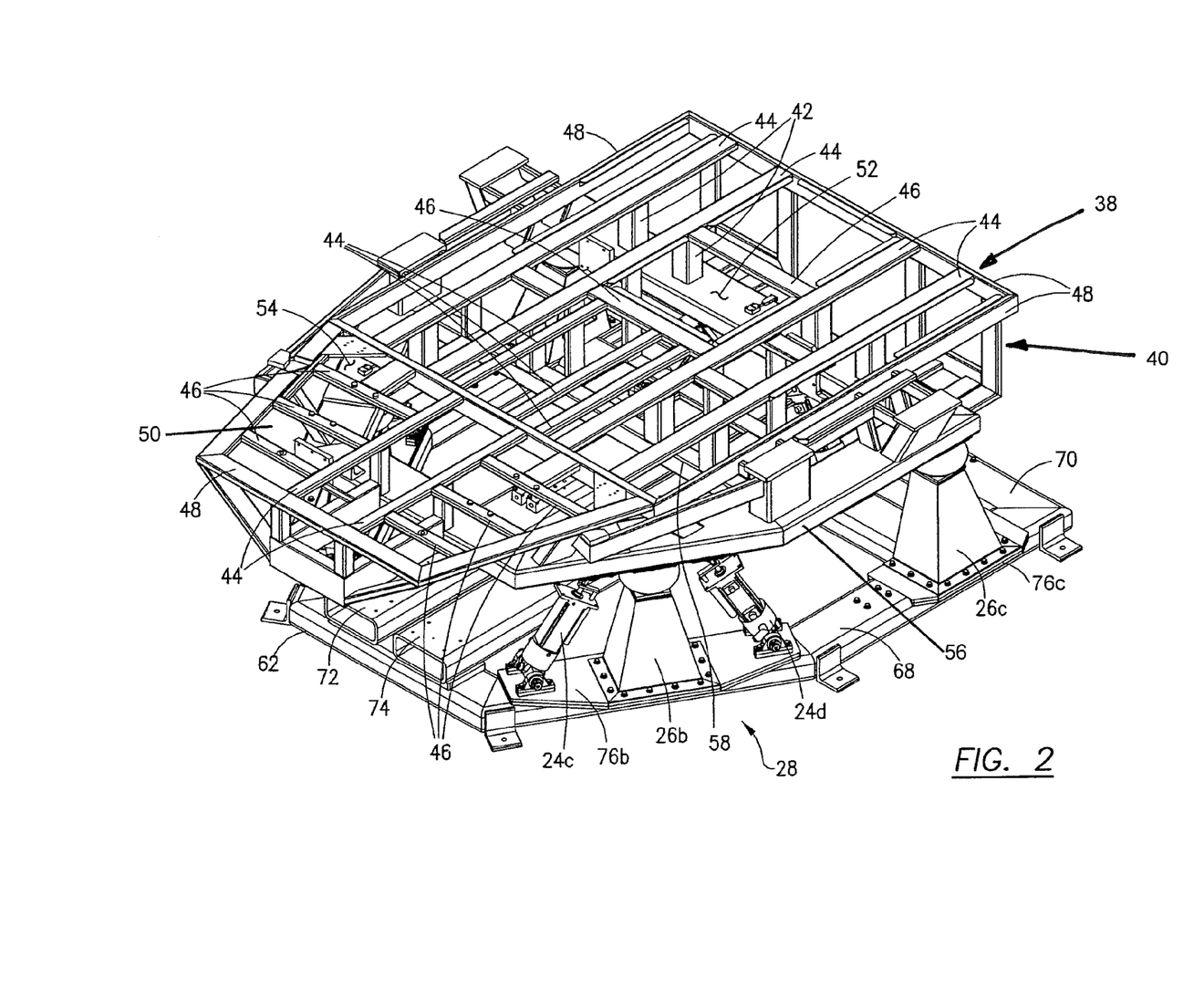
FIG. 2 is a view similar to FIG. 1 except with the motion seats and top plate of the frame assembly removed.

The frame assembly 18 is best shown in FIG. 2. It comprises a support structure 38, a sub-frame 40 and a number of vertical legs 42 which interconnect the support structure 38 and sub-frame 40 to form an essentially one-piece construction. The support structure 38 includes a series of spaced stringers 44 which extend generally parallel to the surge axis depicted in FIG. 8. The stringers 44 connect to cross bars 46, and/or to perimeter bars 48 forming the periphery of the support structure 38. Preferably, the sub-frame 40 comprises a forward plate 50, an aft plate 52, opposed side plates 54 and 56 connected between the forward and aft plates 50, 52 and a cross plate 58 extending between the side plates 54, 56. A top plate 60 is affixed over the support structure 38, as seen in FIG. 1, to which the motion seats 20, 22 are attached. For purposes of the present discussion, the terms "forward" and "aft" are intended to refer to the orientation of the system 10 shown in the Figs. wherein the motion seats 20, 22 face the forward portion or forward end of the system 10 and the opposite direction is the aft portion or aft end of the system 10.

Figure 3:
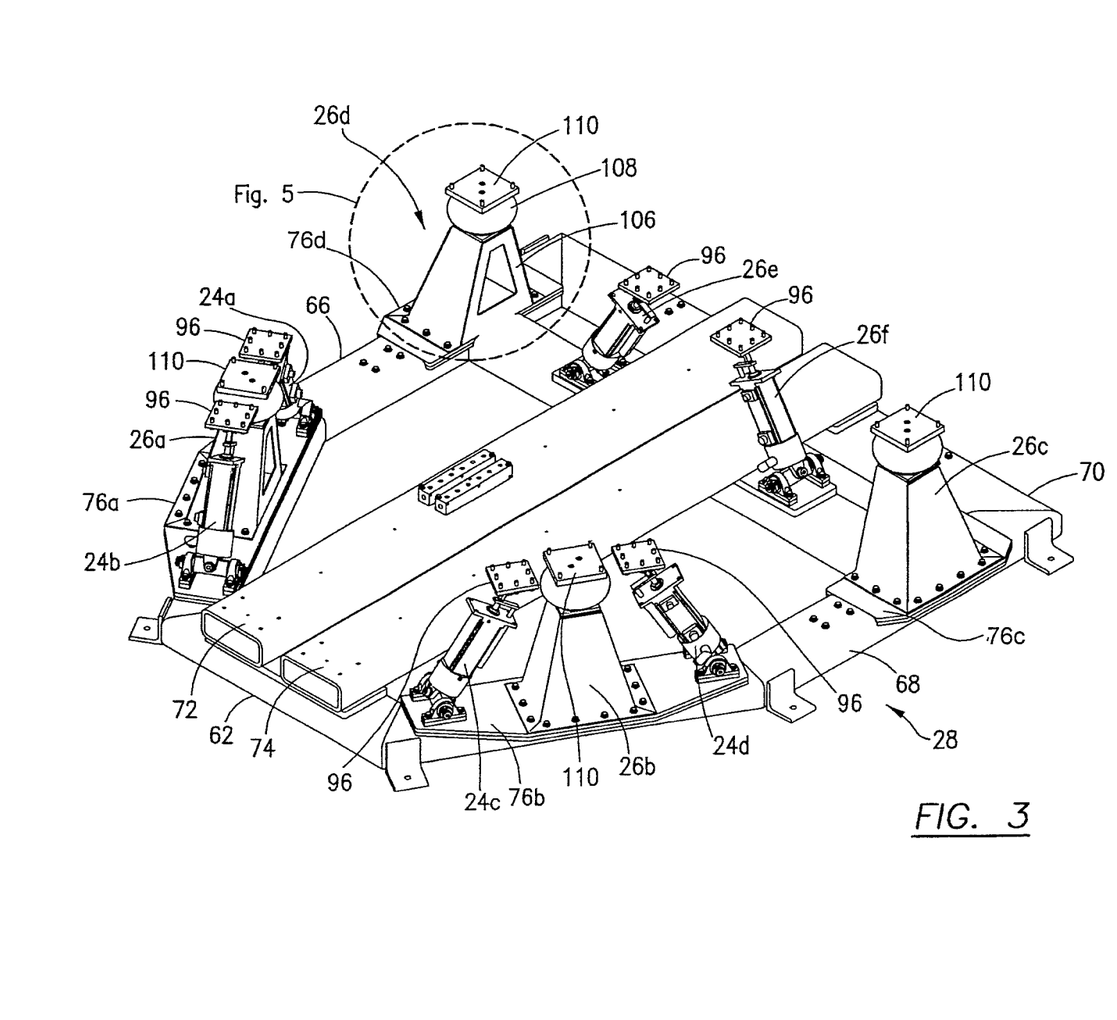
FIG. 3 is a view similar to FIG. 2 except with the frame assembly removed.
Figure 4:
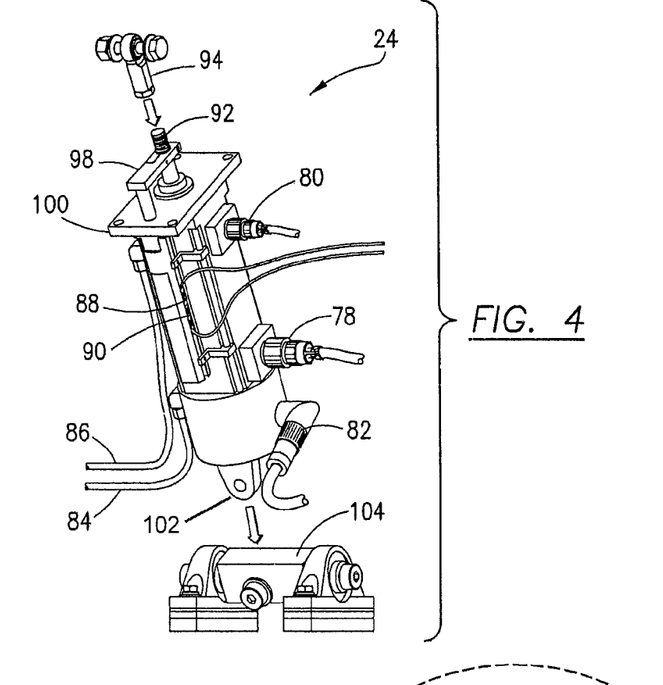
FIG. 4 is a perspective view of an actuator of this invention.
Figure 5:
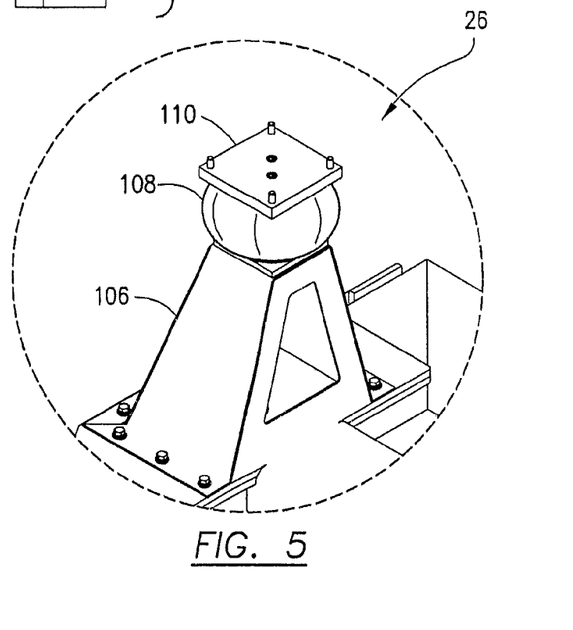
FIG. 5 is a perspective view of an isolator used herein.

As noted above, the frame assembly 18 is supported by six frame actuators 24a-f and four isolators 26a-d, which, in turn, rest atop the base pad 28. Referring in particular to FIGS. 2 and 3, the base pad 28 has the same general shape as the sub-frame 40, including a forward plate 62, an aft plate 64, opposed side plates 66 and 68 and a back plate 70 that connects to the ends of the side plates 66, 68. Preferably, side-by-side channels 72 and 74 extend between the front plate 62 and the back plate 70. The frame actuators 24a-f are arranged in pairs as illustrated in FIG. 3, and all of the frame actuators 24a-f and isolators 26a-d are affixed to one of five mounting plates 76a-e secured to the base pad 28. Specifically, frame actuators 24a and 24b are located on either side of an isolator 26a atop a mounting plate 76a which is affixed to the side plate 66 of base pad 28 proximate the forward end of the frame assembly 18. Similarly, a mounting plate 76b affixed to the side plate 68 of base pad 28 supports isolator 26b positioned between frame actuators 24c and 24d at the forward end of the frame assembly 18 opposite the frame actuators 24a and 24b. The remaining two frame actuators 24e and 24f straddle the channels 72, 74, in the middle of the frame assembly 18 at its aft end, and are connected atop a mounting plate 76c affixed to the aft plate 64. The frame actuators 26e, 26f are positioned between the third isolator 26c resting atop mounting plate 76d affixed to side plate 68, and the fourth isolator 26d which is connected to the side plate 66 by a mounting plate 76e.

In one preferred embodiment, the frame actuators 24a-f are commercially available from the Exlar Corporation of Chanhassen, Minn. under Model No. GSX30, Part No. GSX30-0302-XCM-CT1-238-EB-AR-L3 Actuator. Each frame actuator 24a-f employs a servo motor (not shown) having a power connection 78 and a brake connection 80. The frame actuators 24a-f are equipped with an absolute encoder 81, shown schematically in FIG. 7, having an encoder connection 82. The frame actuators 24a-f are cooled by oil supplied via supply line 84 and withdrawn through a return line 86 which are connected to a cooling rack assembly (not shown). Upper and lower limit switches 88, 90 are provided for purposes discussed below. The shaft 92 of each frame actuator 24a-f is connected to a rod end 94 mounted to a frame interface plate 96 (See FIG. 3), and an anti-rotation bracket 98 extends between the actuator housing 100 and shaft 92 to ensure that the shaft 92 moves in a linear direction. The frame interface plate 96 of each frame actuator 24a-f is bolted or otherwise affixed to the sub-frame 40 of frame assembly 18 to impart motion thereto as the shaft 92 is extended and retracted. A clevis 102 is provided at the base of frame actuators 24a-e which connects to a pivot block 104 affixed to one of the mounting plates 76a-f.

Each of the isolators 26a-d, in one presently preferred embodiment, is commercially available from Firestone Industrial Products Company, LLC of Indianapolis, Ind. under Model No. Air Mount 110, Part No. W01-358-7451. Each isolator 26a-d comprises an isolator support frame 106 which mounts a pneumatic isolator 108. A frame interface plate 110 connects the pneumatic isolator 108 to the frame assembly 18. The frame interface plate 110 of each isolator 26a-d is bolted or otherwise affixed to the sub-frame 40 of frame assembly 18 to assist in dampening the motion of frame assembly 18 in response to operation of the frame actuators 24a-f.

Having described the structural components of system 10, its operation is discussed in more detail below. Initially, as noted above, it should be understood that the system of this invention 10 is capable of providing vibratory, impulse, onset and/or sustained motion cuing for a pilot operating the full flight simulator with which the system 10 is employed. Vibratory cues are low magnitude repetitive movements at frequencies below 25 Hz to simulate rough weather, blade rotation, out-of-balance rotor, rotor gearbox malfunctions, other aircraft equipment issues and external aerodynamic forces applied to an aircraft during flight. Impulse cues result from one-time events such as bird strikes, landing gear extension and retraction and landings.

It must be recognized that the shaft 92 of each frame actuator 24a-f acting on the frame assembly 18, and the seat actuators which create movement of the motion seats 20, 22, have a limited length of linear travel, e.g. on the order of about 0.5 inches (12.7 mm). Vibratory and impulse cues generally may be replicated by such a relatively short linear motion of shaft 92, but a pilot operating the full flight simulator must be provided with the sensation of greater movement in conducting maneuvers such as take-off, landing, banking and the like. Onset cues are vestibular in nature, and sustained cues are onset cues that are maintained for the duration of a given maneuver. The system 10 of this invention employs the principle of acceleration onset cuing using the combination of the movement of frame assembly 18 induced by actuators 24a-f, and movement of the motion seats 20, 22 induced by seat actuators associated with such seats 20, 22. See FIG. 6. Acceleration onset cuing replicates cockpit movement in the six degrees-of-freedom illustrated in FIG. 8, in essentially three phases. Initial acceleration of the aircraft resulting from the performance of a particular maneuver is relatively closely replicated by the system 10. Because the limit of travel of the actuator shafts 92 is quickly reached, after initial acceleration the shaft 92 movement is gradually decreased to zero, e.g. the "washout phase." The frame assembly 18 is then reset to a neutral position, but at a rate below the sensory threshold of the pilot. In this way, maneuvers that would produce relatively large movements of the aircraft can be replicated with frame actuators 24a-f and seat actuators whose shafts 92 have a comparatively small amount of linear 92 travel.

Combined and coordinated movement of the motion seats 20, 22 and frame assembly 18 is important in order to impart accurate sensations of movement, and realistic visual representations, for a given maneuver. As noted above, the motion seats 20, 22 are capable of providing sway, heave, surge and roll motions, whereas the frame assembly is movable in six degrees-of-freedom plus vibration. It is not sufficient for the system 10 to only provide movement of the motion seats 20, 22 during a bank maneuver, for example, since the position of the cockpit controls would also change (tilt) during such maneuver. Consequently, the frame assembly 18 must be employed to provide a combined and coordinated movement with the motion seats 20, 22 in order to replicate a bank maneuver such that not only does the pilot feel the sensation of a bank motion from one of the motion seats 20 or 22 but also visualizes the cockpit controls tilting in the same direction and at the same time as they would in actual flight. The same is true for other maneuvers that can be performed by the aircraft.

Figure 7:
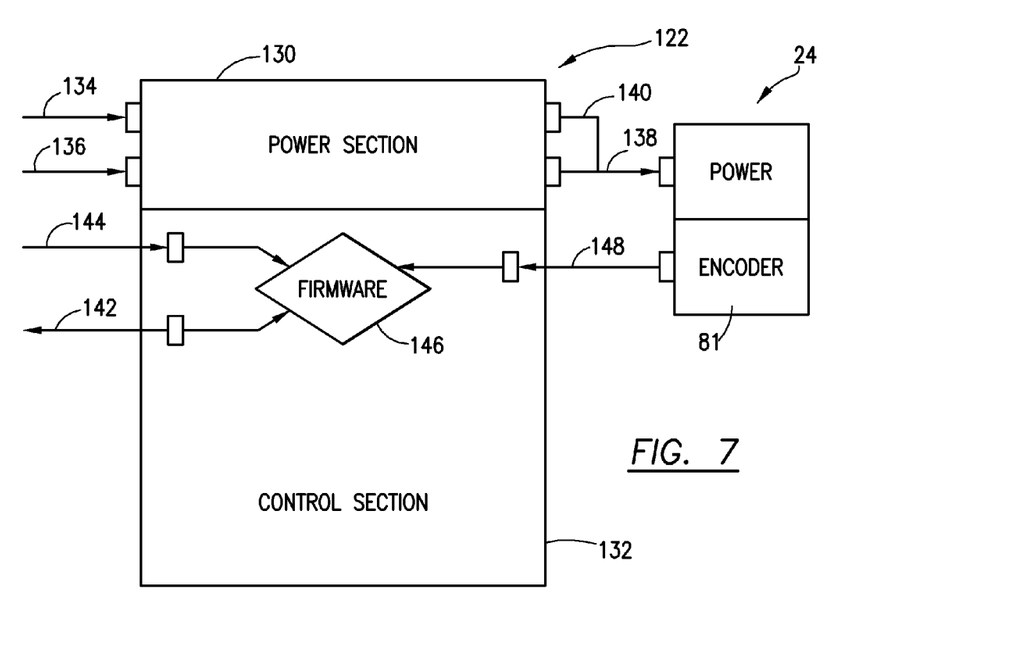
FIG. 7 is a schematic illustration of a drive controller for a frame actuator herein.

Referring now to FIGS. 6 and 7, operation of the system 10 is controlled in response to host command signals from the host computer 12. For example, assuming a pilot operating the cockpit or vehicle instrumentation 14 wishes to perform a banking maneuver, the system 10 must react and provide the pilot with the sensations of movement associated with such a maneuver, e.g. both tactile and visual. An Ethernet connection 112 is provided between the host computer 12 and control computer 16 to transfer host computer signals representative of the maneuver being performed by the pilot. The control computer 16 is connected by a cable 114 to a frame assembly motion drive enclosure 116, a pilot motion seat drive enclosure 118 and a co-pilot motion seat drive enclosure 120. The cable 114 may be a fiber optic, Ethernet, controller-area network (CAN) bus or an analog cable. Each of these enclosures 116, 118 and 120 contains a number of drive controllers 122, schematically depicted in FIG. 7. Enclosure 116 includes six drive controllers 122, one for each of the frame actuators 24a-f as shown in box 124, and each of the enclosures 118, 120 contains four drive controllers 122 to accommodate the four seat actuators employed in the pilot motion seat 20 and the co-pilot motion sear 22 as shown in boxes 126 and 128, respectively.

The drive controller 122 illustrated in FIG. 7 comprises a power section 130 and a control section 132. For purposes of illustration and discussion, one drive controller 122 and one frame actuator 24 are depicted in FIG. 7, although it should be understood that the discussion which follows is equally applicable to the drive controllers and seat actuators associated with the motion seats 20 and 22. The power section 130 of drive controller 122 receives a control voltage via line 134 and three phase mains voltage via line 136. Three phase mains power is supplied to the power connection 78 of the actuator through line 138. An external actuator brake and thermostat connection from the power section 130 to the brake connection 80 of frame actuator 24 is provided through line 140.

An input command signal from the control computer 16 is provided to the control section 132 of drive controller 122 through the cable 114, which includes a TX (transmit) connection 142 and an RX (receive) connection 144. The input signal from control computer 16 is processed by firmware 146 in the control section 132. The firmware 146 is coupled to the encoder connection 82 of a frame actuator 24 via line 148. It uses a signal from such frame actuator 24, and applies mathematical equations, to determine the actuator rotation direction, velocity and torque required to best match the input command signal curve from the control computer 16. An output command from the control section 132 is thus generated which is input to the power section 130. In turn, the power section 130 employs the three-phase input power and the command data from the control section 132 to generate the necessary servo motor signal voltage for the operation of the actuator 24.

Each of the drive controllers 122 within the enclosures 116, 118 and 120 receives the input command signal from control computer 16 via the cable 114. All of the drive controllers 122 function in the manner described above, and their operation is coordinated by the control computer 16 to create the desired combined movement of the frame assembly 18 and motion seat 20 and/or 22 for replication of the particular maneuver that the pilot desires to execute.

Prior to and during system operation, the control computer 16 monitors the status of all connected drive controllers 122. In the event of an error or fault in any of the drive controllers 122, the control computer 16 halts all motion of the system 10 and transmits a fault code to the host computer 14 via the Ethernet connection 112. Other safety features of the system include the use of upper and lower limit switches 88 and 90 to monitor the extent of linear movement of the actuator shafts 92, and accelerometers (not shown) are located on the frame assembly 18 to sense its motion. In the event predetermined limits of movement of the shafts 92 or frame assembly 18 are reached, motion of the system 10 is shut down and an error message generated.

An important advantage of the system 10 of this invention is that it allows full flight simulators to be compact in physical size compared to prior art devices. The frame actuators 24a-f and isolators 26a-d are directly connected to the frame assembly 18, which, in turn, directly mounts the motion seats 20, 22. Unlike prior art systems which employ a motion platform to generate six degrees-of-freedom of motion, and a separate vibration platform to produce vibration, a single frame assembly 18 to which the motion seats 20, 22 are directly mounted collectively produce both the desired six degrees-of-freedom of motion and vibration. This dramatically reduces the physical size and expense of the system 10 compared to the prior art, without sacrificing performance.

While the invention has been described with reference to a preferred embodiment, it should be understood by those skilled in the art that various changes may be made and equivalents substituted for elements thereof without departing from the scope of the invention. In addition, many modifications may be made to adapt a particular situation or material to the teachings of the invention without departing from the essential scope thereof.

For example, it is contemplated that in some applications of the system 10 no isolators 26a-d would be required for dampening the motion of the frame assembly 18. The need for isolators 26a-d depends on the overall weight of the frame assembly 18 and motion seats 20, 22, and/or other factors.

Therefore, it is intended that the invention not be limited to the particular embodiment disclosed as the best mode contemplated for carrying out this invention, but that the invention will include all embodiments falling within the scope of the appended claims.

We claim:

1. A motion and vibration cuing apparatus, comprising:
    a frame assembly;
    at least one motion seat mounted to said frame assembly, said at least one motion seat being operative to impart surge, sway, heave and roll movements to a user seated therein;
    a number of frame actuators each having a shaft mounted to said frame assembly, each of said frame actuators being operated to extend and retract said shaft thereof in a first mode of operation and in a second mode of operation said frame actuators being effective in said first mode of operation to produce repetitive movements of said frame assembly, said frame actuators being effective in said second mode of operation to move said frame assembly in six degrees-of-freedom of motion;
    a controller coupled to said frame actuators and to said at least one motion seat;
    said controller being effective to operate said frame actuators in said first mode of operation in order to simulate vibratory motion which is transmitted by said frame assembly to the user seated in said at least one motion seat;
    said controller being effective to operate said frame actuators in said second mode of operation in coordination with the operation of said at least one motion seat using acceleration onset cuing to simulate surge, sway, heave, roll, pitch and yaw motions for the user seated in said at least one motion seat.

2. The apparatus of claim 1 in which said frame assembly includes a sub-frame and a support structure connected to said sub-frame.

3. The apparatus of claim 2 further including a number of isolators, said frame actuators and said isolators being connected to said frame assembly independently of one another.

4. The apparatus of claim 3 further including a number of mounting plates, each of said frame actuators and said isolators extending between one of said mounting plates and said frame assembly.

5. The apparatus of claim 2 further including a top plate mounted to said support structure, said at least one motion seat being supported on said top plate.

6. The apparatus of claim 4 in which said frame assembly has a forward end, an aft end and opposed sides, a first isolator extending from one of said mounting plates to said frame assembly at a location between a first frame actuator and a second frame actuator, said first isolator and said first and second frame actuators being located on one side of said frame assembly proximate said forward end thereof.

7. The apparatus of claim 6 in which a second isolator extends from one of said mounting plates to said frame assembly at a location between a third frame actuator and a fourth frame actuator, said second isolator and said third and fourth frame actuators being located on the other side of said frame assembly from said first isolator and said first and second frame actuators proximate said forward end thereof.

8. The apparatus of claim 6 in which a fifth frame actuator and a sixth frame actuator are mounted substantially in the center of said frame assembly proximate said aft end thereof.

9. The apparatus of claim 8 in which a third isolator and a fourth isolator are mounted on opposite sides of said frame assembly proximate said aft end thereof, said fifth and sixth frame actuators each being spaced from and located in between said third and fourth isolators.

10. A motion and vibration cuing apparatus, comprising:
    a frame assembly;
    at least one motion seat mounted to said frame assembly, said at least one motion seat being operative to impart surge, sway, heave and roll movements to a user seated therein;
    a number of frame actuators each having a shaft mounted to said frame assembly, said frame actuators being operated to extend and retract said shaft thereof in a first mode of operation and in a second mode of operation, said frame actuators being effective in said first mode of operation to produce repetitive movements of said frame assembly, said frame actuators being effective in said second mode of operation to move said frame assembly in six degrees-of-freedom of motion;
    a controller coupled to said frame actuators and to said at least one motion seat;
    said controller being effective to operate said frame actuators in said first mode of operation in order to provide vibratory cues and impulse cues to the user seated in said at least one motion seat;
    said controller being effective to operate said frame actuators in said second mode of operation in coordination with the operation of said at least one motion seat using acceleration onset cuing to provide onset cues to the user seated in said at least one motion seat, said vibratory cues, impulse cues and onset cues being provided individually or simultaneously by operation of said frame actuators and said at least one motion seat.

11. The apparatus of claim 10 in which said frame assembly includes a sub-frame and a support structure connected to said sub-frame.

12. The apparatus of claim 11 further including a number of isolators, said frame actuators and said isolators being connected to said frame assembly independently of one another.

13. The apparatus of claim 12 further including a number of mounting plates, each of said frame actuators and said isolators extending between one of said mounting plates and said frame assembly.

14. The apparatus of claim 11 further including a top plate mounted to said support structure, said at least one motion seat being supported on said top plate.

15. The apparatus of claim 12 in which said frame assembly has a forward end, an aft end and opposed sides, a first isolator extending from one of said mounting plates to said frame assembly at a location between a first frame actuator and a second frame actuator, said first isolator and said first and second frame actuators being located on one side of said frame assembly proximate said forward end thereof.

16. The apparatus of claim 15 in which a second isolator extends from one of said mounting plates to said frame assembly at a location between a third frame actuator and a fourth frame actuator, said second isolator and said third and fourth frame actuators being located on the other side of said frame assembly from said first isolator and said first and second frame actuators proximate said forward end thereof.

17. The apparatus of claim 16 in which a fifth frame actuator and a sixth frame actuator are mounted substantially in the center of said frame assembly proximate said aft end thereof.

18. The apparatus of claim 17 in which a third isolator and a fourth isolator are mounted on opposite sides of said frame assembly proximate said aft end thereof, said fifth and sixth frame actuators each being spaced from and located in between said third and fourth isolators.

19. Apparatus for simulating the motion of a vehicle, comprising:
   a frame assembly;
   at least one motion seat mounted upon said frame assembly, said at least one motion seat including a number of seat actuators which are operative to impart surge, sway, heave and roll movements to a user seated therein;
   a number of frame actuators each having a shaft connected to said frame assembly, each of said frame actuators being operated to extend and retract said shaft thereof in a first mode of operation and in a second mode of operation, said frame actuators being effective in said first mode of operation to produce repetitive movements of said frame assembly, said frame actuators being effective in said second mode of operation to move said frame assembly in six degrees-of-freedom of motion;
   a host computer, said host computer being effective to output a host command signal which is representative of a maneuver that may be performed by the vehicle;
   a control computer coupled to said host computer;
   a number of frame drive controllers each coupled to said control computer and to one of said frame actuators, said control computer being effective in response to said host command signal to cause said frame drive controllers to operate said frame actuators in said first mode of operation in order to simulate vibratory motion which is transmitted by said frame assembly to a user seated within said at least one motion seat;
   a number of seat drive controllers each coupled to said control computer and to one of said seat actuators, said control computer being effective in response to said host command signal to cause said seat drive controllers to operate said seat actuators and to cause said frame drive controllers to operate said frame actuators in said second mode of operation in coordination with said seat actuators using acceleration onset cuing in order to simulate surge, sway, heave roll, pitch and yaw motions for the user seated in said at least one motion seat, whereby the tactile and visual sensations of the user while performing the maneuver are substantially replicated.

20. The apparatus of claim 19 in which each of said frame actuators includes a servo motor and an encoder.

21. The apparatus of claim 20 in which each of said frame drive controllers comprises a power section coupled to said servo motor of one of said frame actuators, and a control section coupled to said encoder of said one frame actuator.

22. The apparatus of claim 21 in which said control computer is operative, in response to receipt of said host command signal, to produce an input command signal.

23. The apparatus of claim 22 in which said control section of each of said frame drive controllers, using an encoder signal from a frame actuator coupled thereto, is operative in response to said input command signal to determine actuator direction, velocity and torque which best matches said input command signal, said control section generating an output command to said power section of said frame drive controller which provides corresponding servo motor signal voltage for input to said servo motor of said frame actuator.

24. A method of imparting motion and vibration cues to a user, comprising:
   (a) providing a frame assembly;
   (b) providing at least one motion seat which is mounted to said frame assembly, said at least one motion seat being operative to impart surge, sway, heave and roll movements to a user seated therein;
   (c) providing a number of frame actuators each having a shaft mounted to said frame assembly, said shafts of said frame actuators being extendable and retractable in a first mode of operation to produce repetitive movements of said frame assembly and in a second mode of operation to move said frame assembly in six degrees-of-freedom of motion;
   (d) operating said frame actuators in said first mode of operation in order to simulate vibratory motion which is transmitted by said frame assembly to the user seated in said at least one motion seat;
   (e) coordinating said second mode of operation of said frame actuators with the operation of said at least one motion seat using acceleration onset cuing to simulate surge, sway, heave, roll, pitch and yaw motions for the user seated in said at least one motion seat.

25. A method of imparting motion and vibration cues to a user, comprising:
   (a) providing a frame assembly;
   (b) providing a motion seat which is mounted to said frame assembly, said motion seat being operative to impart surge, sway, heave and roll movements to a user seated therein;
   (c) providing a number of frame actuators each having a shaft mounted to said frame assembly, said shafts of said frame actuators being extendable and retractable in a first mode of operation to produce repetitive movements of said frame assembly and in a second mode of operation to move said frame assembly in six degrees-of-freedom of motion;
   (d) operating said frame actuators in said first mode of operation in order to provide vibration cues and impulse cues to the user seated in said motion seat;
   (e) coordinating said second mode of operation of said frame actuators with the operation of said at least one motion seat using acceleration onset cuing to simulate surge, sway, heave, roll, pitch and yaw motions for the user seated in said at least one motion seat, said vibratory cues, said impulse cues and said acceleration onset cues being provided to the user individually or simultaneously by operation of said frame actuators and said motion seat.

26. A method of imparting motion and vibration cues to a user, comprising:
   (a) providing a frame assembly;
   (b) providing a motion seat mounted to said frame assembly, said motion seat including a number of seat actuators which are operative to impart surge, sway, heave and roll movements to a user seated therein;
   (c) providing a number of frame actuators each mounted to said frame assembly, said frame actuators being effective in a first mode of operation to produce repetitive movements of said frame assembly in order to simulate vibratory motion, said frame actuators being effective in a second mode of operation to move said frame assembly in six degrees-of-freedom of motion;
   (d) providing a controller coupled to said seat actuators and to said frame actuators;

(e) operating said frame actuators in said first mode of operation, said simulated vibratory movement produced by said frame actuators in said first mode of operation being transmitted by said frame assembly to the user seat in said motion seat;
(f) transmitting a signal from said controller to said seat actuators and to said frame actuators in order to coordinate said second mode of operation of said frame actuators with the operation of said motion seat using acceleration onset cuing thereby simulating surge, sway, heave, roll, pitch and yaw motions for the user seated in said at least one motion seat.

* * * * *